(12) United States Patent
Shin

(10) Patent No.: US 11,470,753 B2
(45) Date of Patent: Oct. 18, 2022

(54) ELECTROMOTIVE HOE

(71) Applicant: TWOY. CO. LTD., Busan (KR)

(72) Inventor: Yun Cheol Shin, Busan (KR)

(73) Assignee: TWOY. CO. LTD., Busan (KR)

( * ) Notice: Subject to any disclaimer, the term of this patent is extended or adjusted under 35 U.S.C. 154(b) by 303 days.

(21) Appl. No.: 16/916,355

(22) Filed: Jun. 30, 2020

(65) Prior Publication Data

US 2021/0378157 A1    Dec. 9, 2021

(30) Foreign Application Priority Data

Jun. 8, 2020   (KR) .................. 10-2020-0069044

(51) Int. Cl.
*A01B 1/06* (2006.01)
*A01B 1/10* (2006.01)

(52) U.S. Cl.
CPC ............... *A01B 1/065* (2013.01); *A01B 1/10* (2013.01)

(58) Field of Classification Search
CPC .. A01B 1/00; A01B 1/065; A01B 1/10; A01B 1/14; A01B 1/06; A01B 33/027; A01B 33/085; A01B 33/106
See application file for complete search history.

(56) References Cited

U.S. PATENT DOCUMENTS

| | | | | |
|---|---|---|---|---|
| 2,888,084 A | * | 5/1959 | Trecker ................. | A01B 1/065 56/13.7 |
| 3,554,293 A | * | 1/1971 | Aman ..................... | A01G 20/30 172/13 |
| 3,781,991 A | * | 1/1974 | Stretton ............... | A01D 34/902 30/276 |
| 4,293,041 A | * | 10/1981 | Holmstadt ............. | A01B 33/06 172/39 |

(Continued)

FOREIGN PATENT DOCUMENTS

| KR | 10-2015-0054639 A | 5/2015 |
|---|---|---|
| KR | 10-2019-0090237 A | 8/2019 |

(Continued)

OTHER PUBLICATIONS

Korean Office Action for related KR Application No. 10-2020-0069044 dated May 13, 2022 from Korean Intellectual Property Office.

(Continued)

*Primary Examiner* — Jamie L McGowan
(74) *Attorney, Agent, or Firm* — Paratus Law Group, PLLC

(57) ABSTRACT

An electromotive hoe includes a working rod which has a predetermined length, and has a power source provided at one side thereof and a shaft protruding from the other side thereof so that a rotational force of the power source is transmitted; an upper cover which has a disc shape and has a first through hole formed in the central portion so that the (Continued)

shaft is inserted; a rotating plate which has a plate-like structure, and has a second through hole formed in the central portion so that the shaft is inserted, and is coupled to an end portion of the shaft by a fastening means to be in close contact with a lower surface of the upper cover; and a hoe blade formed to protrude vertically along the edge of the rotating plate.

3 Claims, 6 Drawing Sheets

(56) References Cited

U.S. PATENT DOCUMENTS

| | | | | |
|---|---|---|---|---|
| 4,744,148 | A * | 5/1988 | Brown | B23D 61/06 |
| | | | | 83/839 |
| 4,911,247 | A * | 3/1990 | Kuhlmann | A01B 1/065 |
| | | | | 172/111 |
| 5,056,605 | A * | 10/1991 | Bond | A01B 1/065 |
| | | | | 172/111 |
| 5,361,570 | A * | 11/1994 | Bernardy | A01D 34/005 |
| | | | | 56/DIG. 17 |
| 5,493,783 | A * | 2/1996 | Oostendorp | A01D 34/84 |
| | | | | 30/287 |
| 5,875,700 | A * | 3/1999 | Powell | A01D 34/73 |
| | | | | 83/837 |
| 6,105,351 | A * | 8/2000 | Itoh | A01D 34/90 |
| | | | | 56/DIG. 17 |
| 7,171,798 | B1 * | 2/2007 | Bernardy | A01D 34/73 |
| | | | | 56/255 |
| 7,882,774 | B1 * | 2/2011 | Bernardy | A01D 34/43 |
| | | | | 83/835 |
| 10,149,434 | B2 * | 12/2018 | Martinsson | A01D 34/73 |
| 10,257,971 | B2 * | 4/2019 | Kittelson | A01B 33/085 |
| 2006/0070752 | A1 * | 4/2006 | Amor | A01B 1/065 |
| | | | | 172/41 |
| 2011/0253399 | A1 * | 10/2011 | Wagner | A01D 34/63 |
| | | | | 172/111 |
| 2016/0309640 | A1 * | 10/2016 | Marken | A01B 1/065 |
| 2017/0215337 | A1 * | 8/2017 | Doughty | A01D 34/78 |

FOREIGN PATENT DOCUMENTS

| | | |
|---|---|---|
| KR | 20-2019-0002988 U | 12/2019 |
| KR | 20-2019-0003175 | 12/2019 |

OTHER PUBLICATIONS

Korean Office Action for related KR Application No. 10-2020-0069044 dated Jun. 14, 2022 from Korean Intellectual Property Office.

* cited by examiner

ELECTROMOTIVE HOE

CROSS-REFERENCE TO RELATED APPLICATIONS

This application claims priority to and the benefit of Korean Patent Application No. 10-2020-0069044 filed on Jun. 8, 2020, which is hereby incorporated by reference in its entirety.

BACKGROUND

The present invention relates to an electromotive hoe, and more specifically, to an electromotive hoe that improves work efficiency while minimizing safety accidents that may occur due to scattering stones and minimizing high-viscosity mud, etc. from being attached to the blade.

In order to cultivate crops in the field or cultivate an open field to use the cultivated open filed as a field, weeds need to be removed from the soil or the soil turns over to pick out stones, and a farming implement used for such a work is a hoe. Typically, the hoe is a small farming implement consisting of a handle and a triangular plate-shaped hoe blade, and the work using the hoe is performed by moving little by little in a sitting position. As an example, in Korea Utility Model Publication No. 20-2019-0003175 (Dec. 27, 2019), there is disclosed a sickle hoe for weeding which is attached with a sickle blade to be suitable for use when easily removing the weeds in grooves or furrows of the field.

Since the work using the hoe itself is very difficult, an electromotive hoe has been developed for more convenient work. In this technology, a hoe is provided on a vehicle body provided with wheels, and when a worker pushes the vehicle body, a power source separately provided on the vehicle body rotates the hoe to remove weeds or turn over the soil.

However, in the related art as described above, there is a possibility that the blade is easily broken by stones or the like in the working process, and in this case, there is a problem in that a safety accident occurs due to the broken blade. In addition, the load is concentrated and applied at one point of the blade and the blade wears out rapidly, resulting in increasing the cost and time required for replacement, and there was a problem that a safety accident may occur when the blade is stuck in the grooves or furrows when working in inclined grooves or furrows.

PRIOR ART

Patent Document (Patent Document 1) Korean Utility Model Publication No. 20-2019-0003175 (Dec. 27, 2019)

SUMMARY

The present invention is derived to solve the problems in the related art as described above, and an object of the present invention is to provide an electromotive hoe that improves work efficiency while minimizing safety accidents that may occur due to scattering stones and minimizing high-viscosity mud, etc. from being attached to the blade.

Objects to be solved by the present invention are not limited to the aforementioned objects and other objects which are not mentioned herein to be solved by the present invention will be clearly understood by those skilled in the art from the following description.

According to a preferred embodiment of the present invention, an electromotive hoe comprises a working rod which has a predetermined length, and has a power source provided at one side and a shaft protruding from the other side so that a rotational force of the power source is transmitted, an upper cover which has a disc shape and has a first through hole formed in the central portion so that the shaft is inserted, a rotating plate which has a plate-like structure, and has a second through hole formed in the central portion so that the shaft is inserted, and is coupled to an end portion of the shaft by a fastening means to be in close contact with a lower surface of the upper cover, and a hoe blade formed to protrude vertically along the edge of the rotating plate, wherein the hoe blade is formed so that the protruding length is gradually shortened toward one direction, and the end portion of the hoe blade is uniformly in contact with the ground as a whole when the worker tilts the working rod obliquely based on the ground.

Further, according to the preferred embodiment of the present invention, a plurality of hoe blades may be arranged radially with respect to the center of the shaft, but arranged to be spaced apart from each other at regular intervals to form an empty space between the hoe blade and an adjacent hoe blade, so that foreign substances on the ground may be discharged to the empty space between the hoe blade and the adjacent hoe blade.

Further, according to the preferred embodiment of the present invention, the hoe blade may include a plurality of blade portions formed convexly on the lower surface of the hoe blade and the ground may be scratched when the hoe blade is rotated.

Further, according to the preferred embodiment of the present invention, one side of the hoe blade may be formed to be rounded.

Further, according to the preferred embodiment of the present invention, an end portion of the hoe blade may be formed to be bent.

By the technical solution, according to the electromotive hoe of the present invention, since the hoe blade is formed so that the protruding length is gradually shortened toward one direction to increase an effective work area so that the end portion of the hoe blade is in uniform contact with the ground as a whole while a worker tilts a working rod obliquely to the ground, there is an effect to improve the work efficiency.

Further, according to the electromotive hoe of the present invention, since a portion of the hoe blade uniformly receives an external force as a whole without receiving the external force intensively, there is an advantage of preventing the life of the hoe blade from being reduced when a portion of the hoe blade is rapidly worn.

Further, according to the electromotive hoe of the present invention, since the hoe blade is in uniform contact with the ground as a whole even if the worker performs the work by tilting the working rod with his back straight, there is an advantage of significantly reducing the fatigue of the worker.

Further, according to the electromotive hoe of the present invention, since an empty space is formed between the hoe blade and an adjacent hoe blade, there are advantages of preventing the hoe blade from being broken by discharging foreign substances of the ground to the empty space between the hoe blade and the adjacent hoe blade and preventing a safety accident by minimizing the hard materials from being bounced in a direction toward the worker even if hard materials such as stones is scattered.

Further, according to the electromotive hoe of the present invention, when the front of the hoe blade is formed to be rounded and comes into contact with an uneven ground surface such as grooves or furrows, there is an advantage of preventing a safety accident by preventing the front of the hoe blade from being stuck in the uneven ground.

Effects of the present invention are not limited to the aforementioned effects and other effects which are not mentioned herein will be clearly understood to those skilled in the art from the following description.

DETAILED DESCRIPTION

Figure 1:
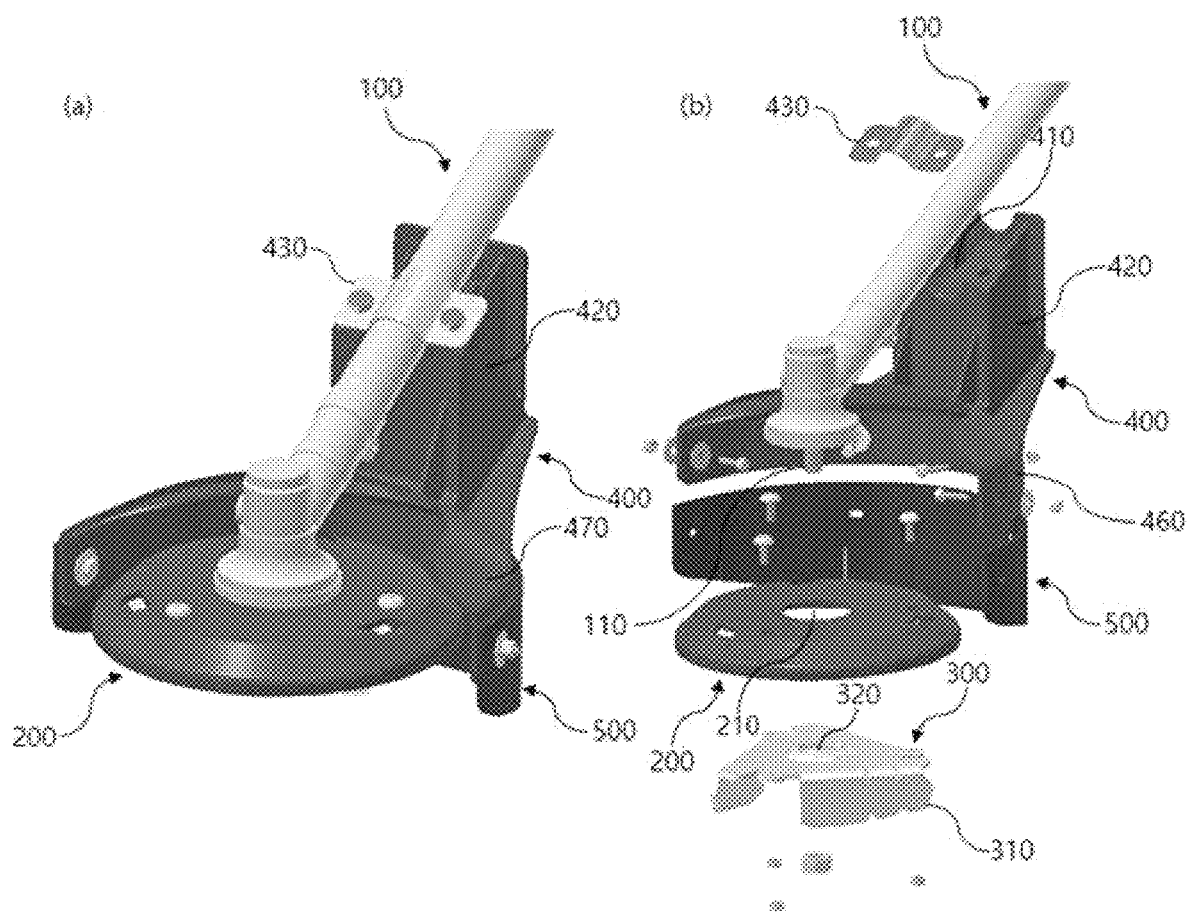
FIG. 1 illustrates (a) a perspective view illustrating a configuration of an electromotive hoe according to an embodiment of the present invention, and (b) an exploded view illustrating the configuration of the electromotive hoe according to the embodiment of the present invention.

Terms used in the present specification will be described in brief and the present invention will be described in detail.

Terms used in the present invention adopt general terms which are currently widely used as possible by considering functions in the present invention, but the terms may be changed depending on an intention of those skilled in the art, a precedent, emergence of new technology, etc. Accordingly, the term used in the present invention should be defined based on not just a name of the term but a meaning of the term and contents throughout the present invention.

Further, throughout the specification, when any part "comprises" any constituent element, unless explicitly described to the contrary, it is meant that other constituent elements are not excluded, but may be further comprised.

An embodiment of the present invention will be hereinafter described in detail with reference to the accompanying drawings so as to be easily implemented by those skilled in the art to which the present invention belongs. However, the present invention may be embodied in many different forms and are limited to embodiments described herein.

Specific matters including problems to be solved for the present invention, solutions of the problems, and the effects of the invention for the present invention are included in embodiments and drawings to be described below. Advantages and features of the present invention, and methods for achieving the same will be apparent with reference to embodiments to be described below in detail together with the accompanying drawings.

Hereinafter, the present invention will be described in more detail with reference to the accompanying drawings.

An electromotive hoe according to a preferred embodiment of the present invention includes a working rod 100 which has a predetermined length, and has a power source (not illustrated) provided at one side thereof and a shaft 110 protruding from the other side thereof so that a rotational force of the power source is transmitted, an upper cover 200 which has a disc shape and has a first through hole 210 formed in the central portion so that the shaft 110 is inserted, and a rotating plate 300 which has a plate-like structure and has a second through hole 320 formed in the central portion so that the shaft 110 is inserted, and is coupled to an end portion of the shaft 110 by a fastening means to be in close contact with a lower surface of the upper cover 200.

First, the working rod 100 is provided. The working rod 100 is a rod gripped by a worker during a working process and has a predetermined length, wherein the power source (not illustrated) is provided on one side thereof and the shaft 110 protrudes from the other side thereof so that the rotational force of the power source is transmitted. The power source may be constituted by a small engine or a motor, and the technique related to the working rod is widely known in the related art and thus the detailed description of the working rod will be omitted.

Next, the upper cover 200 is provided. The upper cover 200 is formed in a disc shape, and the first through hole 210 is formed in the central portion thereof. The shaft 110 is inserted into the first through hole 210. An edge portion of the upper cover 200 may be formed in a shape forming a curvature downward. In this case, it is possible to prevent a safety accident by bouncing stones or the like to be scattered in the working process.

Next, the rotating plate 300 is provided. The rotating plate 300 is a means for wedding or digging the ground, and is formed in a plate-like structure, and the second through hole 320 is formed in the central portion thereof. The second through hole 320 is a portion into which the shaft 110 is inserted, and when the upper cover 200 is inserted into the shaft 110, the rotating plate 300 is in close contact with the lower surface of the upper cover 200, and the end portion of the shaft 110 exposed through the second through hole 320 is coupled by a fastening means such as nuts. Accordingly, when the shaft 110 rotates, each of the upper cover 200 and the rotating plate 300 rotates together with the shaft 110.

At this time, the rotating plate 300 includes a hoe blade 310 formed to protrude vertically along the edge of the rotating plate 300. The hoe blade 310 is formed so that the protruding length is gradually shortened toward one direction, and thus, the end portion of the hoe blade 310 is uniformly in contact with the ground 10 as a whole when the worker tilts the working rod 100 obliquely based on the ground.

Figure 2:
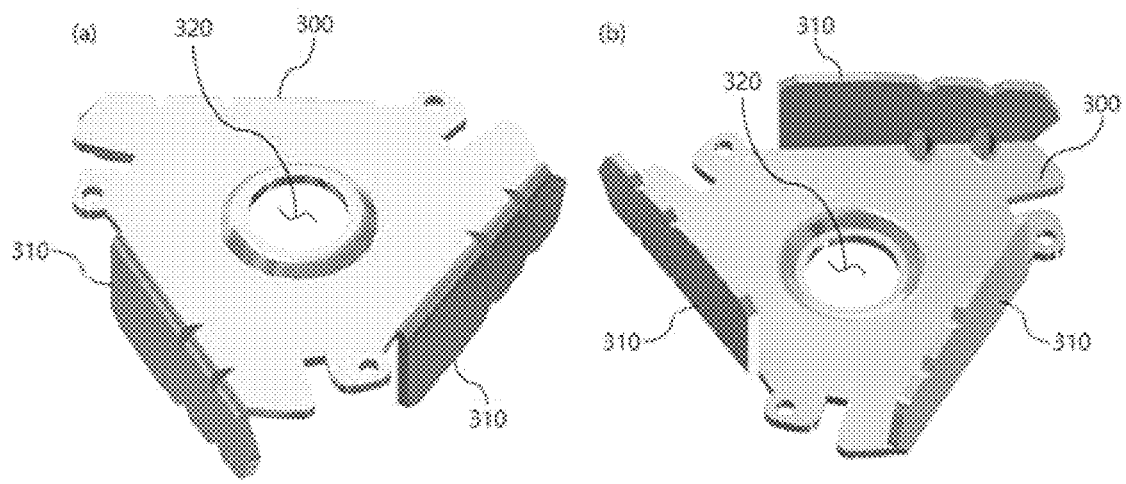
FIG. 2 is a diagram illustrating an appearance of a hoe blade of the electromotive hoe according to the embodiment of the present invention.

More specifically, referring to FIG. 2, the rotating plate 300 is formed in a triangular plate-like structure and the hoe blade 310 is formed at the edge of the rotating plate 300 to protrude vertically in a direction toward the ground 10.

At this time, the length of the hoe blade 310 protruding from the rotating plate 300 is gradually shortened toward one direction. For example, referring to FIG. 3, (a), the length of the hoe blade 310 protruding from the rotating plate 300 is gradually shortened toward the right.

Figure 3:
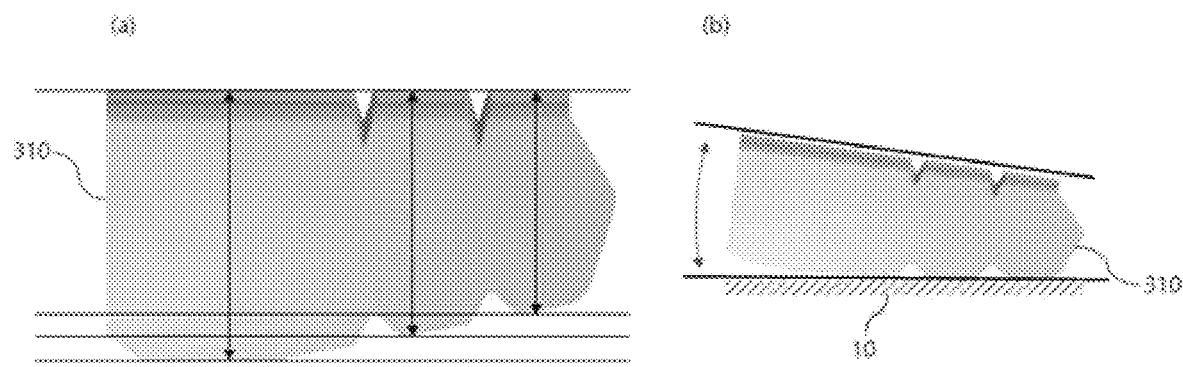
FIG. 3 illustrates (a) a diagram illustrating an appearance in which the hoe blade of the electromotive hoe according to the embodiment of the present invention is gradually shortened, and (b) a diagram illustrating an appearance in which it is easy to work by tilting the hoe blade in the electromotive hoe according to the embodiment of the present invention and the hoe blade is in contact with the ground as a whole.

Accordingly, as illustrated in FIG. 3, (b), when the worker obliquely tilts the working rod 100, the end portion of the hoe blade 310 is uniformly in contact with the ground 10 as a whole, thereby maximizing a contact area between the hoe blade 310 and the ground 10. In other words, it is possible to more efficiently perform the weeding or the work of digging the ground 10. That is, an effective working area in which the hoe blade 310 may sweep the ground 10 is increased, thereby improving work efficiency.

In addition, even if the weeding or the work of digging the ground 10 is repeated, a portion of the hoe blade 310 uniformly receives an external force as a whole without receiving the external force intensively to prevent the life of the hoe blade 310 from being reduced when the portion of the hoe blade 310 is rapidly worn.

In addition, even if the worker performs the work by tilting the working rod 100 with his back straight, the hoe blade 310 is in even contact with the ground 10 as a whole, thereby reducing significantly the fatigue of the worker.

Further, a plurality of hoe blades 310 are arranged radially with respect to the center of the shaft 110, but arranged to be spaced apart from each other at regular intervals to form an empty space between the hoe blade 310 and an adjacent hoe blade 310, so that foreign substances on the ground are discharged to the empty space between the hoe blade 310 and the adjacent hoe blade 310.

Figure 4:
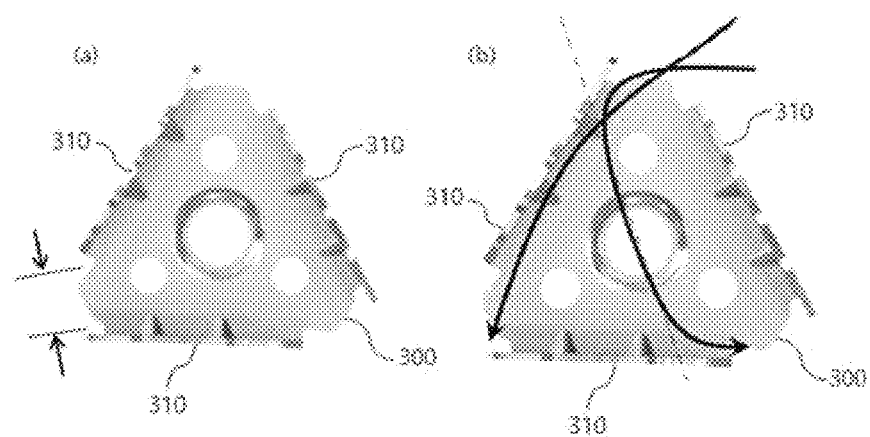
FIG. 4 illustrates (a) diagram illustrating an appearance in which an empty space is formed between the hoe blade and an adjacent hoe blade in the electromotive hoe according to the embodiment of the present invention, and (b) a diagram illustrating an appearance in which foreign substances flow into the empty space formed between the hoe blade and the adjacent hoe blade in the electromotive hoe according to the embodiment of the present invention.

More specifically, referring to FIG. 4, (a), an empty space is formed between the hoe blade 310 and the adjacent hoe blade 310. That is, a total of three empty spaces are formed at an angled portion of the rotating plate 300. Therefore, referring to FIG. 4, (b), during working, as the hoe blade 310 scratches or digs the ground 10, even if the stones 20 placed on the ground 10 are introduced between the hoe blade 310 and the adjacent hoe blade 310, the stones 20 are removed through the empty space between the hoe blade 310 and the adjacent hoe blade 310, thereby preventing the stones from being fitted to the hoe blade 30 or the hoe blade 310 from being broken by rotating with the rotating plate 300. In addition, during the working, even if the stones 20 are scattered and bounced, the stones 20 are prevented from being bounced in a direction toward the worker, thereby minimizing safety accidents.

In addition, the hoe blade 310 includes a plurality of blade portions formed convexly on the lower surface of the hoe blade 310, so that the ground is scratched when the hoe blade 310 is rotated.

Figure 5:
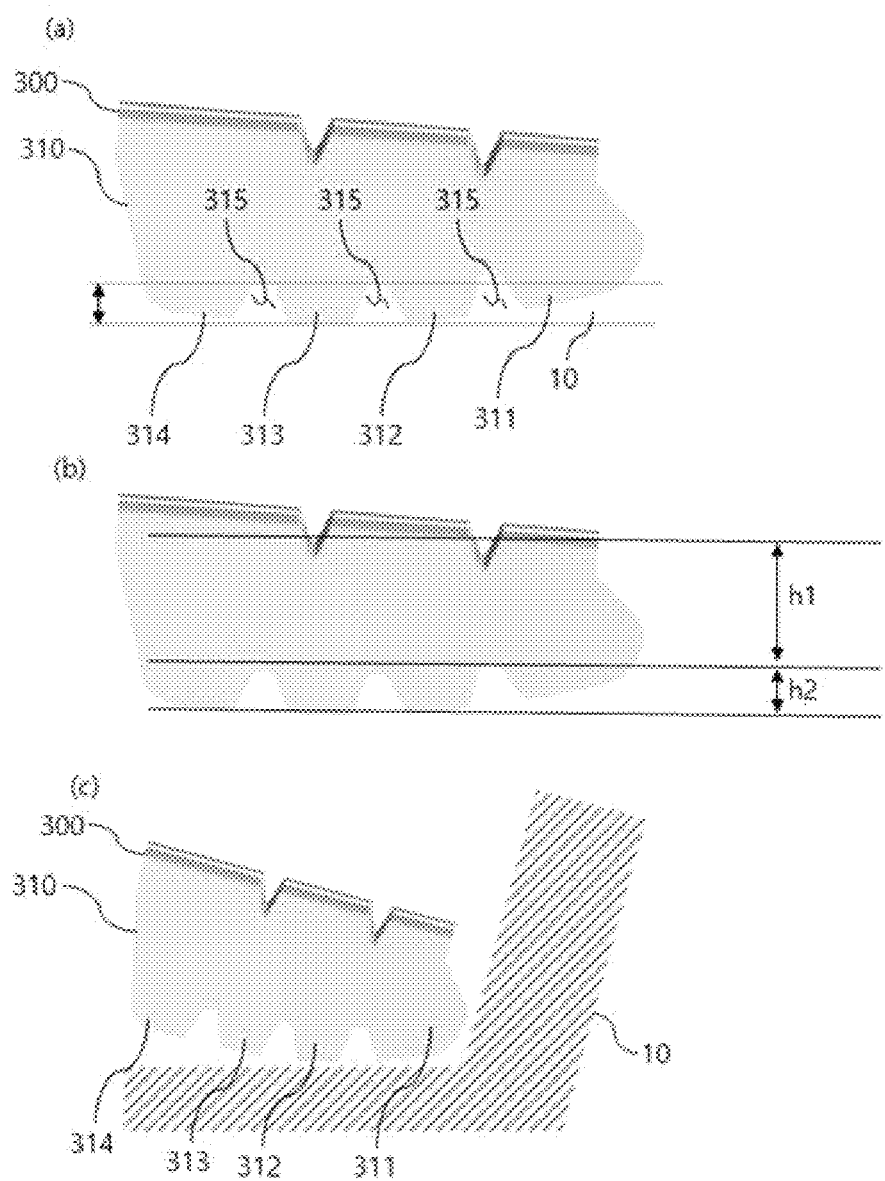
FIG. 5 illustrates (a) a diagram illustrating a plurality of blade portions of an electromotive hoe according to another embodiment of the present invention, (b) a diagram illustrating a length of a groove portion to a length of a hoe blade of an electromotive hoe according to yet another embodiment of the present invention, and (c) a diagram illustrating an appearance in which the front of the hoe blade is formed to be rounded in the electromotive hoe according to yet another embodiment of the present invention.

More specifically, referring to FIG. 5, (a), the hoe blade 310 may include a first blade portion 311 which is provided relatively on the front side thereof and formed to protrude from the hoe blade 310 at the shortest length, a second blade portion 312 which is provided adjacent to the first blade portion 311 and formed to protrude longer than the first blade portion 311, a third blade portion 313 which is provided adjacent to the second blade portion 312 and formed to protrude longer than the second blade portion 312, a fourth blade portion 314 which is provided adjacent to the third blade portion 313 and formed to protrude longer than the third blade portion 313, and a plurality of groove portions 315 provided among the first blade portion 311, the second blade portion 312, the third blade portion 313, and the fourth blade portion 314, respectively.

At this time, the plurality of groove portions 315 have portions which are in contact with the ground to be sharply formed to serve to scrape the ground 10, and the plurality of blade portions have portions which are in contact with the ground to be flatly or roundly formed to serve to remove the weeds by sweeping the ground 10. That is, the plurality of blade portions are convexly formed on the lower surface of the hoe blade 310 to be spaced apart from each other at predetermined intervals, so that the plurality of groove portions 315 are formed to scratch the ground 10 when the hoe blade 310 rotates.

Here, referring to FIG. 5, (b), the plurality of groove portions 315 may be formed to have a length of 0.2 to 0.4 times larger than the protruding length of the hoe blade 310. At this time, when the plurality of groove portions 315 are formed to have a length of less than 0.2 times larger than the protruding length of the hoe blade 310, there is a problem that the ground is not deeply scraped during the working, the weeding work is not easily performed, and thus the work efficiency is reduced. In addition, when the plurality of groove portions 315 are formed to have a length of more than 0.2 times larger than the protruding length of the hoe blade 310, there is a problem that the rigidity of the hoe blade 310 decreases, and thus the hoe blade 310 is easily damaged or broken during the working to reduce the life of the hoe blade 310. Accordingly, the plurality of groove portions 315 are formed to have a length of 0.2 to 0.4 times larger than the protruding length of the hoe blade 310.

Further, one side of the hoe blade 310 may be formed to be rounded. In more detail, referring to FIG. 5, (c), the front of the first blade portion 311 is formed to be rounded to prevent the front of the first blade portion 311 from being stuck in the uneven ground 10 when the front of the first blade portion 311 comes into contact with the uneven ground 10 such as grooves or furrows, thereby preventing safety accidents. That is, the front of the first blade portion 311 is formed to be rounded so that the work may be performed smoothly even on the uneven ground 10.

Figure 6:
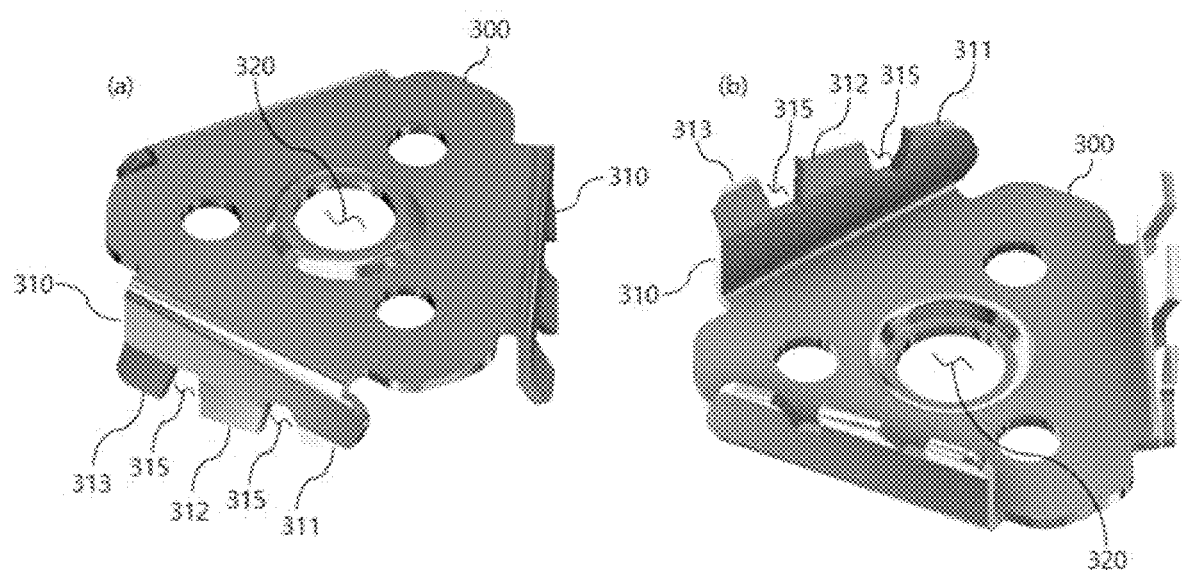
FIG. 6 is a diagram illustrating an appearance in which the end portion of the hoe blade is formed to be bent in the electromotive hoe according to yet another embodiment of the present invention.

Further, the end portion of the hoe blade 310 may be formed to be bent. More specifically, referring to FIG. 6, the end portion of the hoe blade 310 may be formed to be bent in a radial direction (outward direction) based on the center of the second through hole 320. Through this, since the load applied to the hoe blade 310 is reduced when the hoe blade 310 is in contact with the ground 10, there is an advantage of increasing the life of the hoe blade 310. That is, the hoe blade 310 is not in contact with the ground 10 in the vertical direction, but in contact with the ground 10 obliquely to reduce the load applied to the hoe blade 310, thereby minimizing the hoe blade 310 from being damaged or broken.

Further, the end portion of the hoe blade 310 is gradually bent toward one direction to be inclined to the outside, thereby minimizing an area in which the hoe blade 310 is in contact with the ground 10. More specifically, referring to FIG. 7, (a), the end portion of the second blade portion 312 is formed to be bent more outward than the end portion of the first blade portion 311, and the end portion of the third blade portion 313 is formed to be bent more outward than the end portion of the second blade portion 312, thereby increasing an effective working radius of the hoe blade 310.

Figure 7:
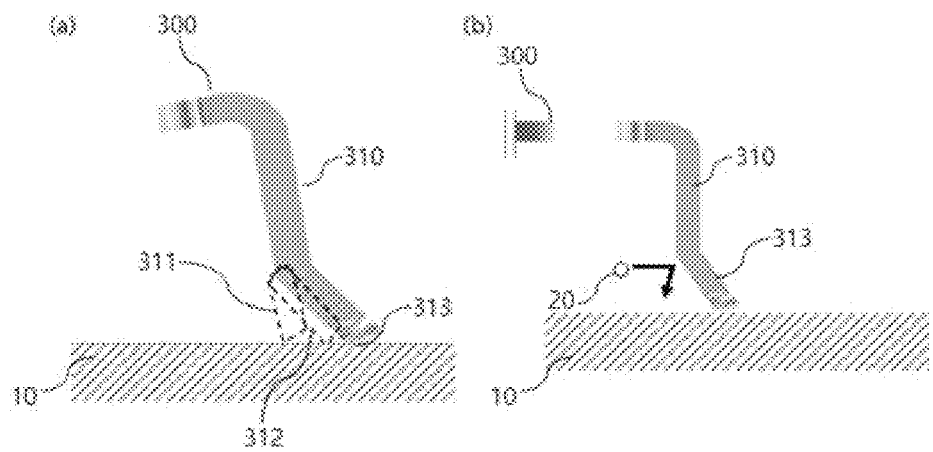
FIG. 7 illustrates (a) a diagram illustrating an appearance in which a plurality of blade portions are formed to be bent at different angles in the electromotive hoe according to yet another embodiment of the present invention, and (b) a diagram illustrating an appearance in which scattering stones hit the hoe blade to be seated on the ground when working with the electromotive hoe according to yet another embodiment of the present invention.

In addition, referring to FIG. 7, (b), since the end portion of the hoe blade 310 is formed to be bent, the stones 20 scattered during working hit the hoe blade 310 and falls in the ground direction, thereby minimizing the stones 20 from being bounced toward the worker.

Figure 8:
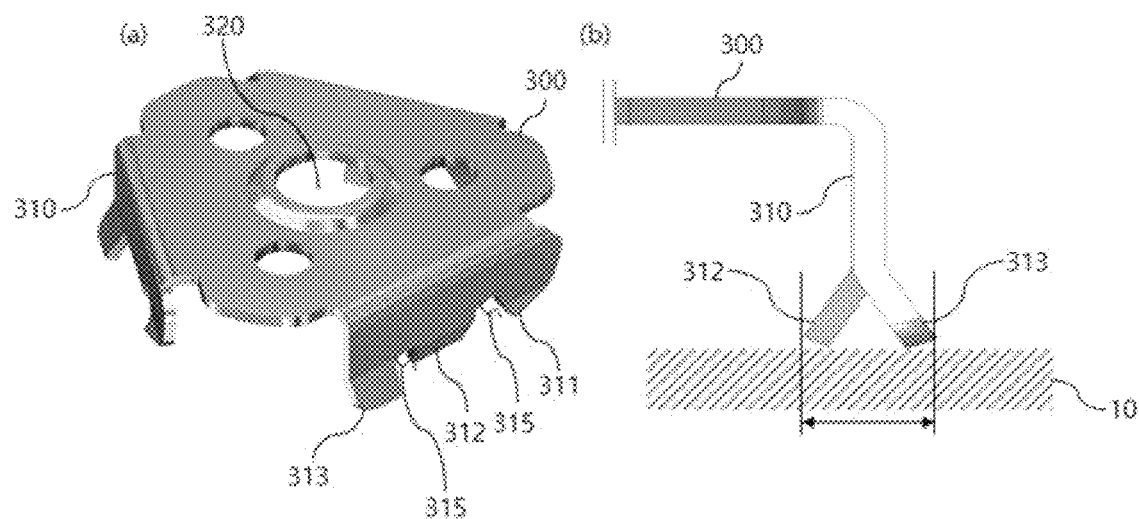
FIG. 8 is a diagram illustrating an appearance in which respective end portions of the plurality of blade portions are formed to be bent in different directions in the electromotive hoe according to yet another embodiment of the present invention.

In addition, referring to FIG. 8, (a), the plurality of blade portions may be formed to be bent in different directions. For example, referring to FIG. 8, the first blade portion 311 and the third blade portion 313 are formed to be bent outward based on the center of the second through hole 320, and the second blade portion 312 is formed to be bent inward based on the center of the second through hole 320, thereby maximizing an area in which the hoe blade 310 is in contact with the ground 10 and increasing an effective working radius.

Figure 9:
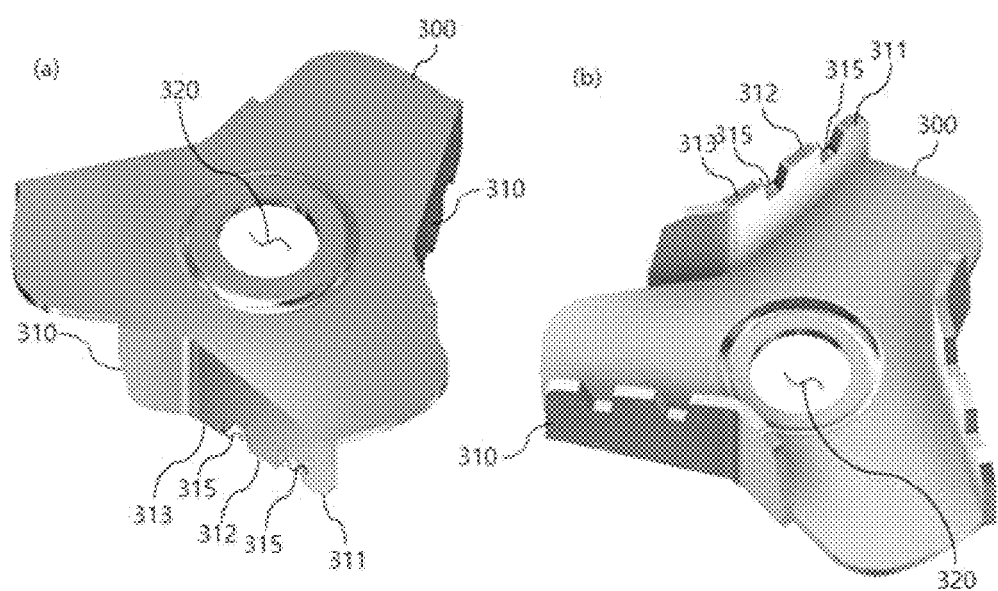
FIG. 9 is a diagram illustrating an appearance in which each side of a rotating plate is concavely formed inward based on the center of the rotating plate in the electromotive hoe according to yet another embodiment of the present invention.

In addition, referring to FIG. 9, each side of the rotating plate 300 may be formed to be concavely recessed inward with respect to the center of the second through hole 320. In other words, each side of the rotating plate 300 may be formed to be rounded in a "U" shape inwardly with respect to the center of the second through hole 320.

Figure 10:
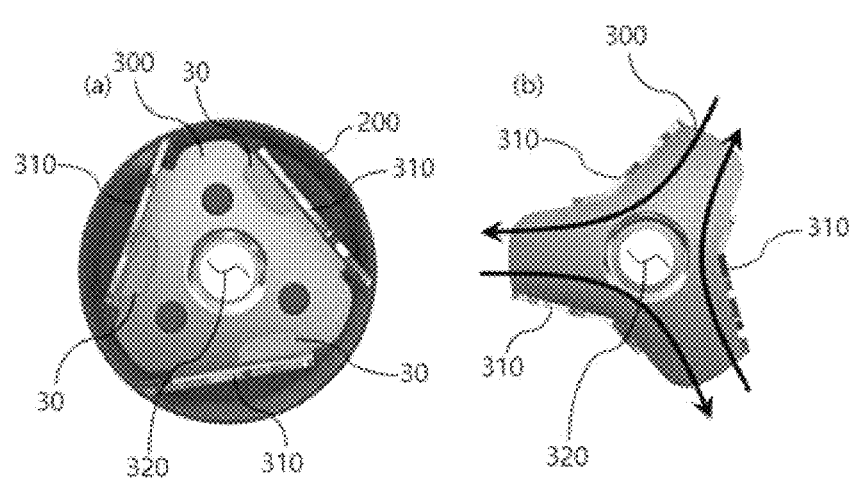
FIG. 10 illustrates (a) a diagram illustrating an appearance in which a rotating plate is formed in a triangular plate-like structure to be attached with high-viscosity materials such as mud in the electromotive hoe according to an embodiment of the present invention, and (b) a diagram illustrating an appearance in which each side of a rotating plate is concavely formed inward based on the center of the rotating plate so that high-viscosity materials such as mud are not attached but flow in the electromotive hoe according to yet another embodiment of the present invention.

In more detail, when the rotating plate 300 is formed in a triangular plate-like structure as illustrated in FIG. 10, (a), there is a problem that the mud 30 is attached between the rotating plate 300 and the hoe blade 310 when the worker performs the work on the ground 10 in a damp state. That is, a high-viscosity material is attached between the rotating plate 300 and the hoe blade 310 and the volume is gradually increased, so that the work efficiency may be reduced. On the other hand, as illustrated in FIG. 10, (b), each side of the rotating plate 300 is concavely formed inwardly with respect to the center of the second through hole 320, thereby minimizing the high-viscosity material such as mud 30 from being attached between the rotating plate 300 and the hoe blade 310.

Next, the electromotive hoe of the present invention may further include a rear cover support 400 which is provided with a seating groove 410 formed on an upper surface portion thereof and seated with a lower portion of the working rod 100, a working rod seating table 420 coupled to a lower portion of the other side of the working rod 100 by a coupling piece 430, and a cover support 460 having a semicircular band shape and a central upper side coupled to the front portion of the working rod seating table 420.

More specifically, the rear cover support 400 is a means for mounting a rear cover 500 to be described below and a means for preventing safety accidents of the worker due to scattering of stones 20, etc., and includes the working rod seating table 420 and the cover support 460. The working rod seating table 420 is a portion that is coupled to the lower portion of the other side of the working rod 100 by the coupling piece 430 as illustrated in FIG. 1, and the seating groove 410 is formed on the upper surface portion. The seating groove 410 may be formed in a recessed semicircular shape, and the lower portion of the working rod 100 is in close contact with the seating groove 410 and seated on the seating groove 410. The cover support 460 is formed in a semicircular band shape, and the central upper portion thereof is coupled with the front portion of the working rod seating table 420. At this time, the cover support 460 may be formed in an integral structure through injection molding with the working rod seating table 420.

In addition, a protrusion plate 470 having a predetermined width may be formed along an upper edge portion of the cover support 460. When the protrusion plate 470 is provided on the upper portion of the cover support 460 formed in the semicircular band shape, the stones and the like scattered upward are bounced downward through the space between the rear cover 500 to be described below and the upper cover 200 in the working process to protect the worker.

Next, the electromotive hoe of the present invention may further include an elastic rear cover 500 in which an upper portion thereof is coupled along the rear surface of the cover support 460 and a plurality of cutout grooves cut to have predetermined lengths from the lower end to the upper side are formed to be spaced apart from each other at regular intervals.

More specifically, the rear cover 500 is a means for preventing weeds, stones, etc. from being scattered to the rear in the working process, and the upper portion thereof is coupled along the rear surface of the cover support 460. At this time, in the rear cover 500, the plurality of cutout grooves cut to have predetermined lengths from the lower end to the upper side may be formed to be spaced apart from each other at regular intervals. The rear cover 500 may be made of an elastic material such as rubber, and is preferably configured to increase a vertical height from both side portions to the central portion. This is because the worker may be very effectively protected from stones and the like scattered to the rear when considering the work characteristics using the working rod 100.

As described above, those skilled in the art will be able to understand that a technical configuration of the present invention can be easily implemented in other detailed forms without changing the technical spirit or a required feature thereof.

Therefore, the embodiments described above are illustrative in all aspects and should be understood as not being restrictive and the scope of the present invention is illustrated by claims to be described below rather than the detailed description, and it is to be interpreted that the meaning and scope of the claims and all changed or modified forms derived from the equivalents thereof are included within the scope of the present invention.

| [Explanation of Reference Numerals and Symbols] | |
|---|---|
| 100: Working rod | 110: Shaft |
| 200: Upper cover | 210: First through hole |
| 300: Rotating plate | 310: Hoe blade |
| 311: First blade portion | 312: Second blade portion |
| 313: Third blade portion | 314: Fourth blade portion |
| 315: Groove portion | 320: Second through hole |
| 400: Rear cover support | 410: Seating groove |
| 420: Working rod seating table | 430: Coupling piece |
| 460: Cover support | 470: Protrusion plate |
| 500: Rear cover | 10: Ground |
| 20: Stones | 30: Mud |
| h1: Length of hoe blade | h2: Length of groove portion |

What is claimed is:

1. An electromotive hoe comprising:

a working rod which has a predetermined length, and has a power source provided at one side thereof and a shaft protruding from the other side thereof so that a rotational force of the power source is transmitted;

an upper cover which has a disc shape and has a first through hole formed in a central portion of the upper cover so that the shaft is inserted;

a rotating plate which has a plate-like structure, and has a second through hole formed in a central portion of the rotating plate so that the shaft is inserted, and is coupled to an end portion of the shaft by a fastening means to be in close contact with a lower surface of the upper cover; and a hoe blade formed to protrude vertically downward along an edge of the rotating plate and configured to scratch the ground when the rotating plate rotates, wherein the hoe blade is formed so that a protruding length along a vertical direction is gradually shortened toward one side of a horizontal direction, and an end portion of the hoe blade is uniformly in contact with the ground as a whole when a user tilts the working rod obliquely based on the ground, wherein the hoe blade includes a plurality of blade portions each formed convexly on a lower surface of the hoe blade, and wherein an end portion of each blade portion is bent outward or inward with respect to a center of the rotating plate such that end portions of two adjacent blade portions are bent in opposite directions to each other.

2. The electromotive hoe of claim 1, wherein a plurality of hoe blades including the hoe blade are arranged radially with respect to a center of the shaft, but arranged to be spaced apart from each other at regular intervals to form an empty space between two adjacent hoe blades, so that foreign substances on the ground are discharged to the empty space between the two adjacent hoe blades.

3. The electromotive hoe of claim 1, wherein one side of the hoe blade is formed to be rounded.

* * * * *